(12) United States Patent
Hirao

(10) Patent No.: US 9,395,844 B2
(45) Date of Patent: Jul. 19, 2016

(54) TERMINAL DEVICE AND CORRECTION METHOD

(71) Applicant: FUJITSU LIMITED, Kawasaki-shi, Kanagawa (JP)

(72) Inventor: Naoya Hirao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 14/282,960

(22) Filed: May 20, 2014

(65) Prior Publication Data

US 2014/0354566 A1    Dec. 4, 2014

(30) Foreign Application Priority Data

Jun. 3, 2013  (JP) ................. 2013-117350

(51) Int. Cl.
*G06F 3/041* (2006.01)
*G06F 3/0488* (2013.01)
*G06F 3/0484* (2013.01)

(52) U.S. Cl.
CPC .............. *G06F 3/0418* (2013.01); *G06F 3/041* (2013.01); *G06F 3/0488* (2013.01); *G06F 3/04842* (2013.01)

(58) Field of Classification Search
CPC .................................................... G06F 3/0418
USPC ................................................. 345/173–175
See application file for complete search history.

(56) References Cited

U.S. PATENT DOCUMENTS

| 8,077,983 B2 | 12/2011 | Qiu et al. |
| 8,164,576 B2 * | 4/2012 | Inoue ................... G06F 3/0418 178/18.02 |
| 8,223,129 B2 * | 7/2012 | Touyamasaki ..... G03G 15/5016 178/18.01 |
| 8,713,433 B1 | 4/2014 | Ouyang et al. |
| 9,030,417 B2 | 5/2015 | Oh et al. |
| 2004/0009788 A1 | 1/2004 | Mantyjarvi et al. |
| 2005/0169527 A1 | 8/2005 | Longe et al. |
| 2006/0066590 A1 | 3/2006 | Ozawa et al. |
| 2008/0142280 A1 * | 6/2008 | Yamamoto ............ G06F 3/0416 178/18.02 |
| 2008/0246742 A1 * | 10/2008 | Wang .................. G06F 3/04883 345/173 |
| 2008/0259048 A1 | 10/2008 | Touyamasaki |
| 2010/0182260 A1 * | 7/2010 | Kiyuna ................... A63F 13/06 345/173 |

(Continued)

FOREIGN PATENT DOCUMENTS

| EP | 2383641 A2 | 11/2011 |
| JP | 05-289816 A | 11/1993 |

(Continued)

OTHER PUBLICATIONS

U.S. Office Action dated Sep. 3, 2015 in U.S. Appl. No. 13/892,607.

(Continued)

*Primary Examiner* — Sanjiv D Patel
(74) *Attorney, Agent, or Firm* — Maschoff Brennan

(57) ABSTRACT

A terminal device includes a memory, and a processor coupled to the memory, configured to calculate a difference between first input coordinates that are related to start-up of a first icon on a touch panel and second input coordinates that are related to start-up of a second icon on the touch panel when the start-up of the second icon is detected after termination of an application that corresponds to the started-up first icon is detected, and modify a correction value of an input position for the touch panel when the difference is within a certain range.

9 Claims, 8 Drawing Sheets

(56) References Cited

U.S. PATENT DOCUMENTS

| | | |
|---|---|---|
| 2010/0251105 A1 | 9/2010 | Dubs et al. |
| 2010/0259561 A1 | 10/2010 | Forutanpour et al. |
| 2011/0090151 A1 | 4/2011 | Huang et al. |
| 2011/0267278 A1* | 11/2011 | Wickstrom ......... G06F 3/04886 345/173 |
| 2013/0285914 A1 | 10/2013 | Pasquero et al. |
| 2013/0326395 A1* | 12/2013 | Oh ..................... G06F 3/041 715/781 |
| 2014/0152599 A1* | 6/2014 | Lee ..................... G06F 3/017 345/173 |
| 2014/0168171 A1* | 6/2014 | Oh ..................... G06F 3/0418 345/178 |
| 2014/0253441 A1* | 9/2014 | Liang ................. G06F 3/0416 345/157 |

FOREIGN PATENT DOCUMENTS

| | | |
|---|---|---|
| JP | 09-330175 A | 12/1997 |
| JP | 2000066817 A | 3/2000 |
| JP | 2003-177847 A | 6/2003 |
| JP | 2003-288156 A | 10/2003 |
| JP | 2004-341813 A | 12/2004 |
| JP | 2009-031913 A | 2/2009 |
| WO | 2007/032843 A2 | 3/2007 |

OTHER PUBLICATIONS

European Search Report dated May 23, 2016 in European Patent Application No. 13168023.3.

* cited by examiner

TERMINAL DEVICE AND CORRECTION METHOD

CROSS-REFERENCE TO RELATED APPLICATION

This application is based upon and claims the benefit of priority of the prior Japanese Patent Application No. 2013-117350, filed on Jun. 3, 2013, the entire contents of which are incorporated herein by reference.

FIELD

The embodiments discussed herein are related to a terminal device and a correction method.

BACKGROUND

A touch panel is an electronic component that has functions of a display device and a position input device combined. An example of processing of a device using a touch panel in related art is described. First, the device displays an image on the touch panel, and waits a touch operation by a user. When the touch panel accepts the touch operation, the touch panel outputs the touched coordinates to the device, and the device executes processing that corresponds to the touched coordinates.

Here, when the user performs a touch operation, it is probable that a touch recognition error may occur in which coordinates that are not intended by the user are recognized by the device. FIG. 8 is a diagram illustrating an example of the touch recognition error. In the example illustrated in FIG. 8, icons 11a, 11b, and 11c are displayed on a touch panel 11 of a device 10. For example, even when the user intends to press the button 11a, it is probable that the device 10 may recognize that the button 11b has been pressed. To solve the problem of the touch recognition error, for example, there are technologies of the related art. For example, the technologies are discussed in Japanese Laid-open Patent Publication No. 2009-31913, Japanese Laid-open Patent Publication No. 5-289816, and U.S. Patent Application Publication 2008/0259048.

In Japanese Laid-open Patent Publication No. 2009-31913, a technology is discussed in which, in a case where buttons A and B are displayed on a touch panel and the button B is pressed, thereafter a cancellation operation is performed on the pressing, and then the button A is pressed, it is determined that a user has pressed the button B by mistake. In addition, Japanese Laid-open Patent Publication No. 2009-31913 describes a technique to increase a display area of the button A and a touch recognition area of the button A.

In Japanese Laid-open Patent Publication No. 5-289816, a technology is discussed in which a position of a user's eye is obtained and an angle between a touch panel and the position of the user's eye is calculated, and the display position of a display panel is shifted based on the calculation result.

SUMMARY

According to an aspect of the invention, a terminal device includes a memory, and a processor coupled to the memory, configured to calculate a difference between first input coordinates that are related to start-up of a first icon on a touch panel and second input coordinates that are related to start-up of a second icon on the touch panel when the start-up of the second icon is detected after termination of an application that corresponds to the started-up first icon is detected, and modify a correction value of an input position for the touch panel when the difference is within a certain range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-described related art, there is a problem that a discrepancy between coordinates that the user intends to input and coordinates that have been recognized by the touch panel is not resolved.

In Japanese Laid-open Patent Publication No. 2009-31913, the display area of a target button and the recognition area of the target button are increased, but the increase in the areas does not solve the fundamental problem. For example, in Japanese Laid-open Patent Publication No. 2009-31913, when the user selects another button, a touch recognition error may occur. In addition, as discussed in Japanese Laid-open Patent Publication No. 5-289816, even when the display position is shifted based on the position of the user's eye, there is a case in which a touch recognition error is not avoided because a way of touch is different among users.

The terminal device, the correction method, and the correction program according to the embodiments are described below in detail with reference to the drawings. Embodiments are not limited to the terminal device, the correction method, and the correction program discussed herein.

Embodiments

Figure 1:
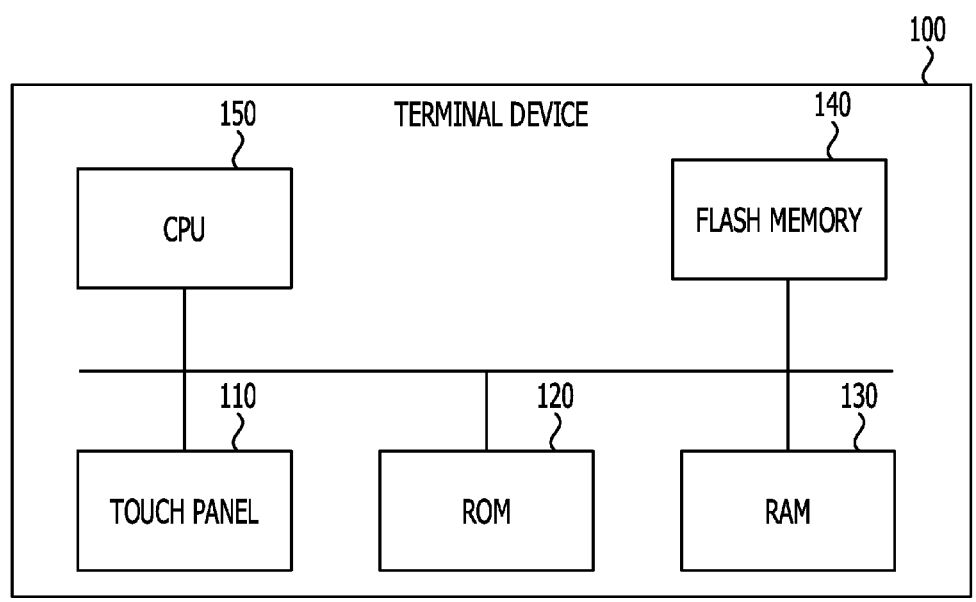
FIG. 1 is a diagram illustrating an example of a structure of a terminal device according to an embodiment.

An example of a structure of a terminal device according to an embodiment is described below. FIG. 1 is a diagram illustrating an example of a structure of the terminal device according to the embodiment. As illustrated in FIG. 1, a terminal device 100 includes a touch panel 110, a read only memory (ROM) 120, a random access memory (RAM) 130, a flash memory 140, and a CPU 150. The other configuration elements are similar to those in a known tablet terminal or the like, so that the description thereof is omitted herein.

The touch panel 110 is an interface that has two functions of display and input. The touch panel 110 displays information that is output from the CPU 150. In addition, when the touch panel 110 accepts a touch operation, the touch panel 110 outputs information on input coordinates that are touched by the user, to the CPU 150.

The ROM 120 and the RAM 130 are storage devices that store various pieces of information.

The flash memory 140 is a storage device that stores information on a correction value. The correction value is a vector value that is used to correct input coordinates by the touch operation. For example, the correction value may be a value that is defined by an angle and a size, or a value that is defined by the size in an x direction and the size in a y direction. The correction value is used by the CPU 150 that is described later.

The CPU 150 is a device that corrects input coordinates obtained from the touch panel 110, using a correction value that is stored in the flash memory 140. The CPU 150 outputs the corrected input coordinates to a host device.

Figure 2:
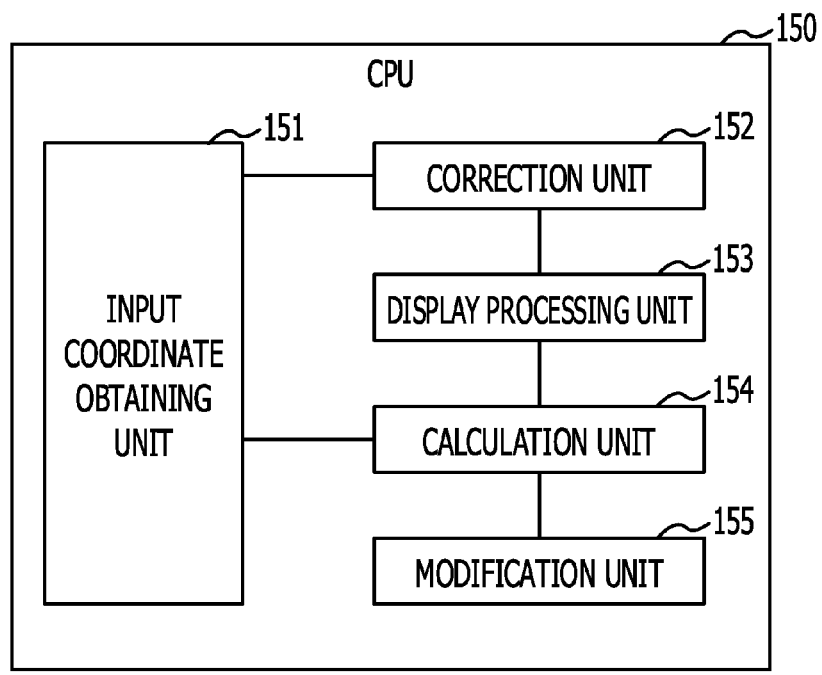
FIG. 2 is a functional block diagram of a central processing unit (CPU) according to the embodiment.

A function structure example of the CPU 150 according to the embodiment is described below. FIG. 2 is a functional block diagram of the CPU according to the embodiment. As illustrated in FIG. 2, the CPU 150 includes an input coordinate obtaining unit 151, a correction unit 152, a display processing unit 153, a calculation unit 154, and a modification unit 155.

The input coordinate obtaining unit 151 is a processing unit that obtains information on input coordinates from the touch panel 110. The input coordinate obtaining unit 151 outputs the information on the input coordinates to the correction unit 152 and the calculation unit 154.

The correction unit 152 is a processing unit that corrects input coordinates by reading a correction value that is stored in the flash memory 140 and adding the read correction value to the input coordinates. The correction unit 152 outputs information on the corrected input coordinates, to the display processing unit 153. In addition, the correction unit 152 outputs the information on the corrected input coordinates to the host device.

An example of the processing of the correction unit 152 is described below. Input coordinates P obtained from the input coordinate obtaining unit 151 are set at (xp, yp), and a correction value is set at (xa, ya). In this example, the correction unit 152 calculates coordinates (xp+xa, yp+ya) that are obtained by adding the correction value to the input coordinates P, as the corrected input coordinates P'. The correction unit 152 outputs the information on the corrected input coordinates P' to the display processing unit 153 and the host device.

Figure 3:
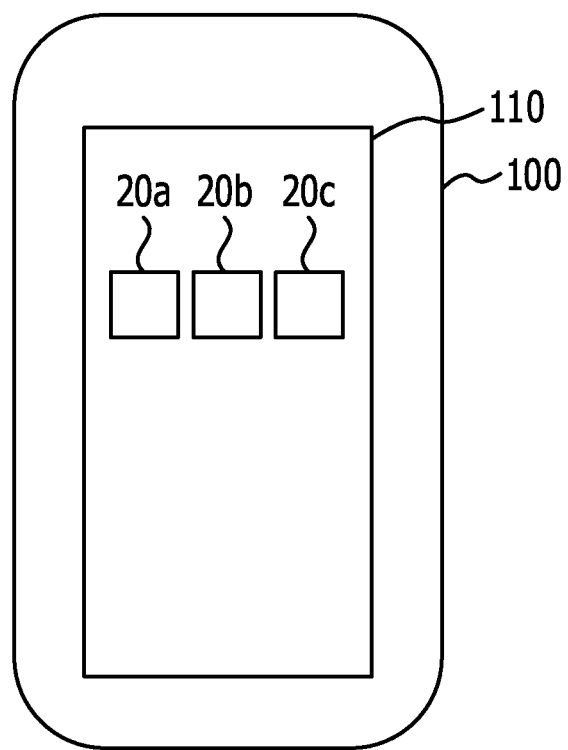
FIG. 3 is a diagram illustrating an example of a screen that is displayed on a touch panel by a display processing unit.

The display processing unit 153 outputs screen information to the touch panel 110 and causes the touch panel 10 to display a certain screen. For example, a plurality of icons are included in the screen that is displayed on the touch panel 110. FIG. 3 is a diagram illustrating an example of a screen that is displayed on the touch panel by the display processing unit 153. In the example illustrated in FIG. 3, icons 20a, 20b, and 20c are displayed on the touch panel 110.

The display processing unit 153 associates each of the icons 20a to 20c with a corresponding application, and starts up an application that corresponds to an icon when the user touches the icon. For example, when the icon 20a is touched, the display processing unit 153 starts up an application A and displays a screen that corresponds to the application A on the touch panel 110. When the icon 20b is touched, the display processing unit 153 starts up an application B and displays a screen that corresponds to the application B on the touch panel 110. When the icon 20c is touched, the display processing unit 153 starts up an application C and displays a screen that corresponds to the application C on the touch panel 110.

When a termination button displayed on a screen that corresponds to an application is touched while the screen is displayed, the display processing unit 153 terminates the application that is being started-up or running.

The display processing unit 153 holds information on the areas of the icons 20a to 20c and the area of the termination button, and determines whether or not any of icons or the termination button is touched, by comparing input coordinates P' that are obtained from the correction unit 152 and the information on each of the areas. For example, the display processing unit 153 determines that the icon 20a has been touched when the input coordinates P' are included in the area of the icon 20a.

The calculation unit 154 is a processing unit that determines whether or not a discrepancy occurs between coordinates that the user intends to input and coordinates that have been recognized by the touch panel. Hereinafter, the discrepancy between coordinates that the user intends to input and coordinates that have been recognized by the touch panel is referred to as a "touch recognition error".

The processing of the calculation unit 154 is described in detail below. Here, as an example, it is assumed that the icon 20a is touched at input coordinates P1, and the application A that corresponds to the icon 20a is started up. In addition, it is assumed that the icon 20b is touched at input coordinates P2, and the application B that corresponds to the icon 20b is started up.

When the following first condition and second condition are satisfied, the calculation unit 154 determines that a touch recognition error occurs. The first condition is a condition that the application A is terminated, and the icon 20b is touched, and the application B is started up within a certain period of time from the time at which the icon 20a is touched and the application A is started up as a start point. The second condition is a condition that a distance between the input coordinates P1 and the input coordinates P2 is less than a certain threshold value. The second condition may be a condition that a difference between the input coordinates P1 and the input coordinates P2 is within a certain range.

The calculation unit 154 obtains, from the display processing unit 153, information on a time at which the application A is started up after the icon 20a has been touched, and information on a time at which the application B is started up after the application A has been terminated and the icon 20b has been touched. In addition, pieces of information on the input coordinates P1 and the input coordinates P2 are obtained from the input coordinate obtaining unit 151.

Here, for convenience of description, the example is described above in which the icon 20a is touched at the input coordinates P1, and the icon 20b is touched at the input coordinates P2, but the embodiments are not limited to such an example. Any one of the icons 20a to 20c and other icons may be touched at the input coordinates P1, and any one of the icons 20a to 20c and other icons may be touched at the input coordinates P2. However, it is assumed that the same icon is not touched at the input coordinates P1 and the input coordinates P2.

The modification unit 155 is a processing unit that modifies a correction value that is stored in the flash memory 140 when a touch recognition error occurs. The modification unit 155 obtains, from the calculation unit 154, information that indicates whether a touch recognition error occurs. Whether or not the above-described second condition is satisfied may be determined by the modification unit 155.

The processing of the modification unit 155 is described in detail below. Here, as an example, a case is described in which a touch recognition error occurs when an icon is touched at the input coordinates P1 and another icon is touched at the input coordinates P2.

Figure 4:
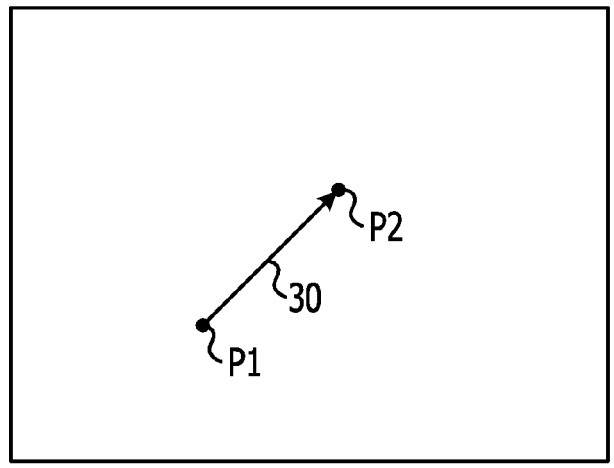
FIG. 4 is a diagram illustrating processing of a modification unit.

FIG. 4 is a diagram illustrating the processing of the modification unit. The modification unit 155 calculates a vector 30 from the input coordinates P1 to the input coordinates P2. The modification unit 155 normalizes the vector 30 after calculating the vector 30. The modification unit 155 may normalize the vector 30 using any known technology. For example, the modification unit 155 normalizes the vector using a conversion table or a conversion formula in which the size of the vector is within a certain size.

After the modification unit 155 normalizes the vector, the modification unit 155 modifies a correction value by adding the vector to the correction value in the flash memory. For example, when the correction value is set at (xa, ya), and the vector that is normalized by the modification unit 155 is set at (xb, yb), the modified correction value is represented as (xa+xb, ya+yb).

Figure 5:
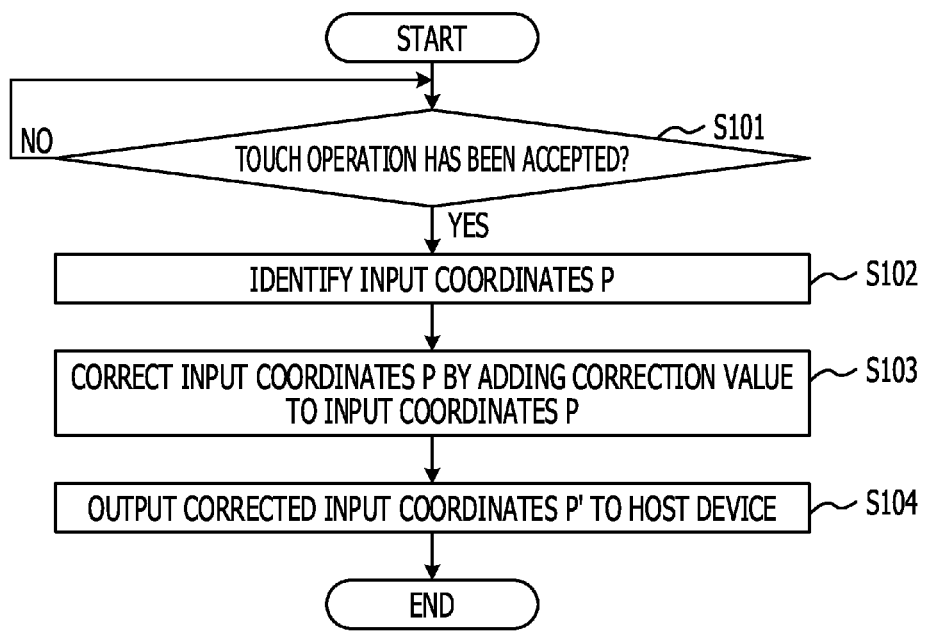
FIG. 5 is a flowchart illustrating a processing procedure in which the terminal device corrects input coordinates.

A processing procedure of the terminal device 100 according to the embodiment is described below. FIG. 5 is a flowchart illustrating a processing procedure in which the terminal device corrects input coordinates. The processing illustrated in FIG. 5 is executed, for example, as a result of accepting a touch operation.

As illustrated in FIG. 5, the terminal device 100 determines whether or not a touch operation has been accepted (Step S101). When the terminal device 100 determines that a touch operation has not been accepted (No in Step S101), the flow proceeds to Step S101 again.

When the terminal device 100 determines that a touch operation has been accepted (Yes in Step S101), the terminal device 100 identifies input coordinates P (Step S102). The terminal device 100 corrects the input coordinates P by adding a correction value to the input coordinates P (Step S103). The terminal device 100 outputs the corrected input coordinates P' to the host device (Step S104).

Figure 6:
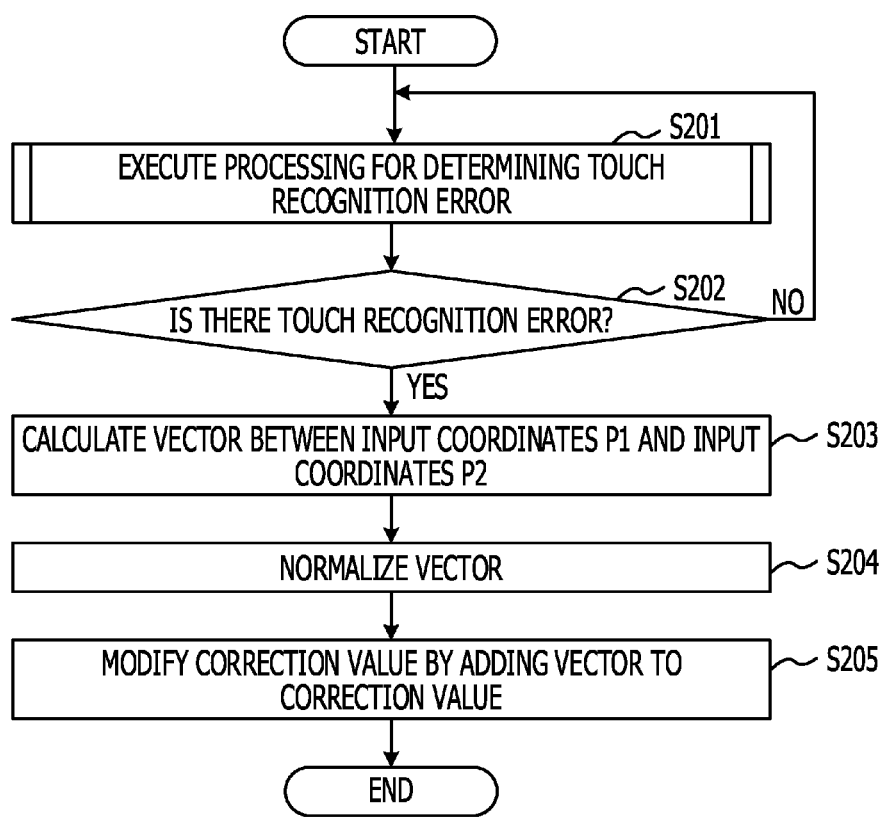
FIG. 6 is a flowchart illustrating a processing procedure in which the terminal device modifies a correction value.

FIG. 6 is a flowchart illustrating a processing procedure in which the terminal device modifies a correction value. As illustrated in FIG. 6, the terminal device 100 executes processing for determining a touch recognition error (Step S201).

The terminal device 100 determines whether or not there is a touch recognition error (Step S202). When the terminal device 100 determines that there is not a touch recognition error (No in Step S202), the flow proceeds to Step S201 again.

When the terminal device 100 determines that there is a touch recognition error (Yes in Step S202), the terminal device 100 calculates a vector between the input coordinates P1 and the input coordinates P2 (Step S203). The terminal device 100 normalizes the vector (Step S204) and modifies a correction value by adding the vector to the correction value (Step S205).

Figure 7:
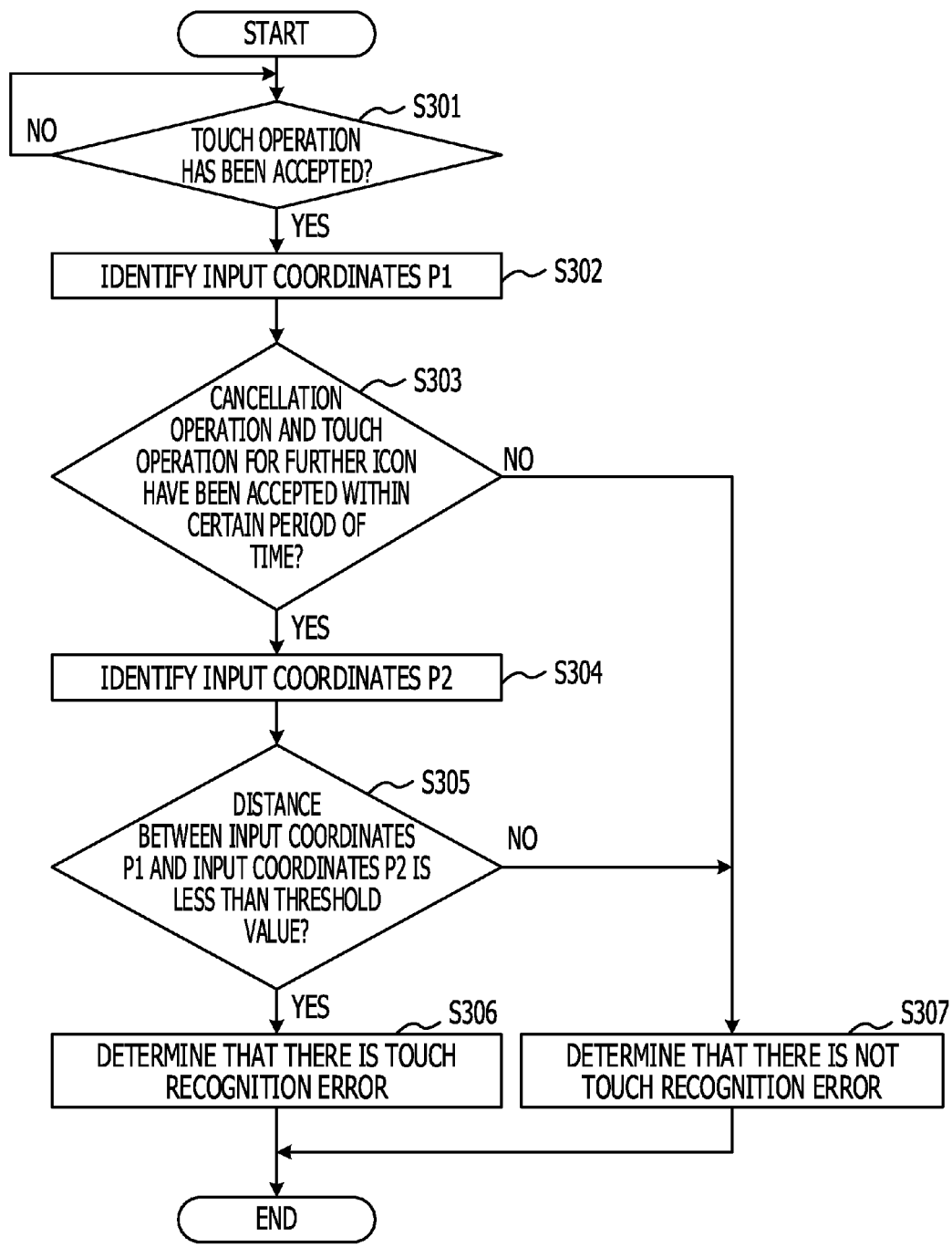
FIG. 7 is a flowchart illustrating processing for determining a touch recognition error.
Figure 8:
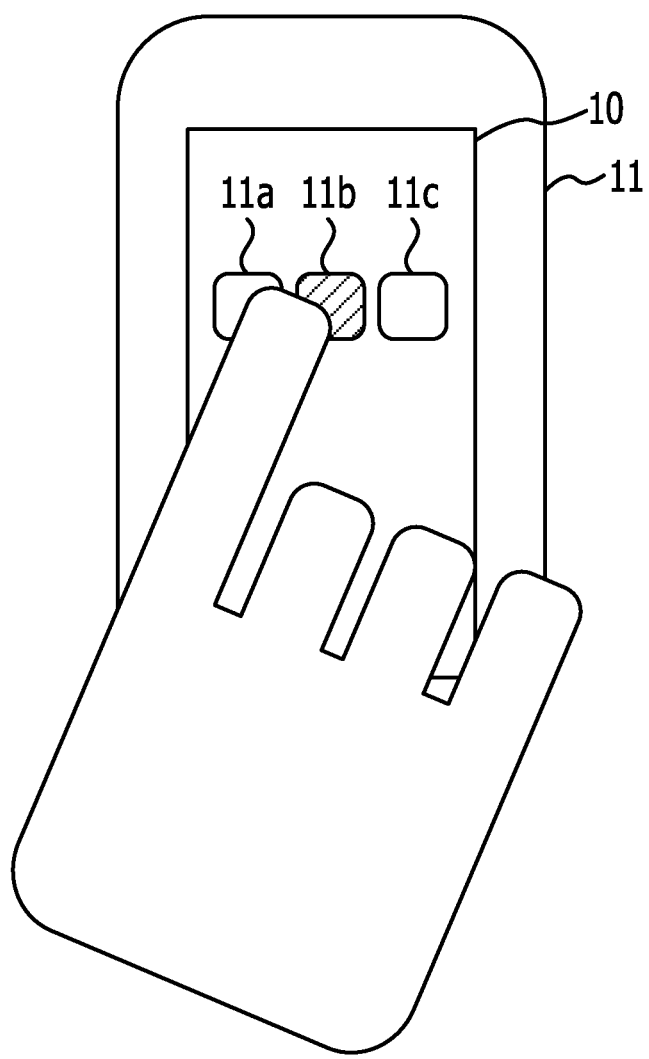
FIG. 8 is diagram illustrating an example of a touch recognition error.

The processing for determining a touch recognition error illustrated in Step S201 in FIG. 6 is described below. FIG. 7 is a flowchart illustrating the processing for determining a touch recognition error. As illustrated in FIG. 7, the terminal device 100 determines whether or not a touch operation has been accepted (Step S301). When the terminal device 100 determines that a touch operation has not been accepted (No in Step S301), the flow proceeds to Step S301 again.

When the terminal device 100 determines that a touch operation has been accepted (Yes in Step S301), the terminal device 100 identifies the input coordinates P1 (Step S302). The terminal device 100 determines whether or not a cancellation operation and a touch operation for another icon have been accepted within a certain period of time (Step S303).

When the terminal device 100 determines that a cancellation operation and a touch operation for another icon have not been accepted within the certain period of time (No in Step S303), the terminal device 100 determines that there is not a touch recognition error (Step S307).

When the terminal device 100 determines that a cancellation operation and a touch operation for another icon have been accepted within the certain period of time (Yes in Step S303), the terminal device 100 identifies the input coordinates P2 (Step S304). The terminal device 100 determines whether or not a distance between the input coordinates P1 and the input coordinates P2 is less than a threshold value (Step S305). When the terminal device 100 determines that the distance between the input coordinates P1 and the input coordinates P2 is not less than the threshold value (No in Step S305), the flow proceeds to Step S307.

When the terminal device 100 determines that the distance between the input coordinates P1 and the input coordinates P2 is less than the threshold value (Yes in Step S305), the terminal device 100 determines that there is a touch recognition error (Step S306).

An effect of the terminal device 100 according to the embodiment is described below. When termination of an application that corresponds to an icon started up through a touch at the input coordinates P1 is detected and start-up of an application that corresponds to another icon through a touch at the input coordinates P2 is detected, the terminal device 100 calculates a difference between the input coordinates P1 and the input coordinates P2. When the difference between the input coordinates P1 and the input coordinates P2 is within a certain range, the terminal device 100 modifies a correction value for the input position. Therefore, in the terminal device 100, a correction value that is used to correct input coordinates may be modified appropriately, and as a result, a discrepancy between coordinates that the user intends to input and coordinates that have been recognized by the touch panel may be resolved.

In addition, in the terminal device 100, when termination of an application that corresponds to an icon started up through a touch at the input coordinates P1 is detected and start-up of another icon is detected within a certain period of time, a correction value for the touch panel is modified. Therefore, each time a touch recognition error occurs, the correction value may be modified.

In addition, in the terminal device 100, a correction value is modified by calculating a vector from the input coordinates P1, as a reference, to the input coordinates P2 and adding the calculated vector to the correction value, so that the processing load of the CPU 150 is reduced and the correction value may be modified with high accuracy.

The above-described embodiments related to the terminal device 100 are merely examples, and the terminal device may execute further processing. For example, the modification unit 155 may undo the size of a correction value into a reference value that has been defined when the size of a modified correction value becomes a specific value or more after the modification unit 155 modifies the correction value.

Here, the terminal device 100 may execute processing that is similar to that of the above-described embodiments by executing a correction program that is stored in the ROM 120 or the like. For example, the terminal device 100 starts up a correction process by executing the correction program that is stored in the ROM 120. The correction process corresponds to the input coordinate obtaining unit 151, the correction unit 152, the display processing unit 153, the calculation unit 154, and the modification unit 155 that are illustrated in FIG. 2.

The correction program may not be stored in the ROM 120 from the beginning. For example, each program may be stored in "a portable physical medium" that is inserted into the terminal device 100, such as a flexible disk (FD), a compact disc-read-only memory (CD-ROM), a digital versatile disc (DVD), an optical magnetic disk, and an integrated circuit (IC) card. The terminal device 100 may read the correction program from the portable physical medium and execute the correction program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
   a touch panel configured to:
   detect a first touch operation at first input coordinates of the touch panel, wherein the first input coordinates correspond to a first icon displayed on the touch panel that corresponds to a first application run on the terminal device;
   detect a second touch operation at second input coordinates of the touch panel, wherein the second input coordinates correspond to a second icon displayed on the touch panel that corresponds to a second application run on the terminal device; and
   a memory configured to store computer-readable instructions; and
   a processor coupled to the memory and configured to, based on the computer-readable instructions stored in the memory:
   obtain, from the touch panel, first information on the first input coordinates;
   obtain, from the touch panel, second information on the second input coordinates;
   determine a first start-up of the first application that is based on the first touch;
   determine a termination of the first application that occurs after the first-start up;
   determine a second start-up of the second application that is based on the second touch;
   determine that the second start-up occurs after the termination of the first application;
   calculate, based on the first information and the second information, a difference between the first input coordinates and the second input coordinates in response to determining that the second touch occurred after the termination of the first application;
   modify a correction value of an input position for the touch panel when in response to the difference being within a certain range;
   apply the correction value to the input position; and
   output screen information to the touch panel based on the input position with the applied correction value such that the touch panel displays a screen according to the screen information and based on the correction value.

2. The terminal device according to claim 1, wherein the processor is configured to:
   determine that the second start-up occurs within a certain period of time after the termination of the first application; and
   modify the correction value of the input position for the touch panel in response to determining that the second start-up occurs within the certain period of time after the termination of the first application.

3. The terminal device according to claim 1, wherein the processor is configured to modify the correction value by calculating a vector from the first input coordinates, as a reference, to the second input coordinates, and adding the calculated vector to the correction value.

4. A correction method comprising:
   obtaining, by a processor from a touch panel of a terminal device, first information on first input coordinates of the touch panel that are based on a first touch operation at the first input coordinates, wherein the first input coordinates correspond to a first icon displayed on the touch panel that corresponds to a first application run on the terminal device;
   obtaining, by the processor from the touch panel, second information on second input coordinates of the touch panel that are based on a second touch operation at the second input coordinates, wherein the second input coordinates correspond to a second icon displayed on the touch panel that corresponds to a second application run on the terminal device;
   calculating, by the processor based on the first information and the second information, a difference between the first input coordinates and the second input coordinates in response to determining that the second touch occurred after the termination of the first application;
   modifying, by the processor, a correction value of an input position for the touch panel in response to the difference being within a certain range;
   applying, by the processor, the correction value to the input position; and
   outputting, by the processor, screen information to the touch panel based on the input position with the applied correction value such that the touch panel displays a screen according to the screen information and based on the correction value.

5. The correction method according to claim 4, further comprising:
   determining that the second start-up occurs within a certain period of time after the termination of the first application; and
   modifying the correction value of the input position in response to determining that the second start-up occurs within the certain period of time after the termination of the first application.

6. The correction method according to claim 4, wherein modifying the correction value further comprises calculating a vector from the first input coordinates, as a reference, to the second input coordinates, and adding the calculated vector to the correction value.

7. A non-transitory machine readable medium storing a program that, when executed by a processor, causes the processor to perform operations comprising:
   obtaining, from a touch panel of a terminal device, first information on first input coordinates of the touch panel that are based on a first touch operation at the first input coordinates, wherein the first input coordinates correspond to a first icon displayed on the touch panel that corresponds to a first application run on the terminal device;

obtaining, from the touch panel, second information on second input coordinates of the touch panel that are based on a second touch operation at the second input coordinates, wherein the second input coordinates correspond to a second icon displayed on the touch panel that corresponds to a second application run on the terminal device;

calculating, based on the first information and the second information, a difference between the first input coordinates and the second input coordinates in response to determining that the second touch occurred after the termination of the first application;

modifying, a correction value of an input position for the touch panel in response to the difference being within a certain range;

applying the correction value to the input position; and outputting screen information to the touch panel based on the input position with the applied correction value such that the touch panel displays a screen according to the screen information and based on the correction value.

8. The non-transitory machine readable medium storing a program according to claim 7, wherein the operations further comprise:

determining that the second start-up occurs within a certain period of time after the termination of the first application; and modifying the correction value of the input position in response to determining that the second start-up occurs within the certain period of time after the termination of the first application.

9. The non-transitory machine readable medium storing a program according to claim 7, wherein modifying the correction value further comprises calculating a vector from the first input coordinates, as a reference, to the second input coordinates, and adding the calculated vector to the correction value.

* * * * *